United States Patent [19]
DeTommaso

[11] 3,894,980

[45] July 15, 1975

[54] THICKENER

[75] Inventor: Gabriel L. DeTommaso, Lansdale, Pa.

[73] Assignee: Rohm and Haas Company, Philadelphia, Pa.

[22] Filed: Apr. 30, 1973

[21] Appl. No.: 355,386

[52] U.S. Cl.... 260/29.6 RW; 260/29.6 T; 260/29.6 TA; 260/29.7 W; 260/29.7 UA; 260/80.76; 260/80.80

[51] Int. Cl. .......................... C08d 7/14; C08f 45/42

[58] Field of Search..... 260/29.6 T, 29.6 W, 29.7 T, 260/29.6 WB, 78.3, 29.6 RW, 86.1, 29.6 TA, 80.8, 80.76; 117/68.5

[56] References Cited
UNITED STATES PATENTS

| | | | |
|---|---|---|---|
| 2,123,599 | 7/1938 | Fikentscher et al. | 260/17 X |
| 2,129,722 | 9/1938 | Woodhouse | 260/86.1 X |
| 2,404,292 | 7/1946 | Hyman | 260/486 |
| 2,440,092 | 4/1948 | Hyman et al. | 260/78.3 |
| 2,870,129 | 1/1959 | Merriam | 260/86.1 |
| 2,906,724 | 9/1959 | Daniel | 260/29.4 X |
| 3,021,295 | 2/1962 | Saxon et al. | 260/29.4 |
| 3,033,811 | 5/1962 | Brown et al. | 260/29.4 |
| 3,240,740 | 3/1966 | Knapp et al. | 260/29.6 |
| 3,300,428 | 1/1967 | Schmidt | 260/29.6 X |
| 3,361,695 | 1/1968 | Wilhelm et al. | 260/29.6 |
| 3,431,226 | 3/1969 | Warson et al. | 260/29.7 |
| 3,441,430 | 4/1969 | Peterson | 117/68.5 |
| 3,511,799 | 5/1970 | Clampitt | 260/29.6;80.8 X |
| 3,575,911 | 4/1971 | Peterson | 260/29.6 |
| 3,598,770 | 8/1971 | Moore et al. | 260/80.8 X |
| 3,621,004 | 11/1971 | Eckert | 260/80.8 X |
| 3,657,175 | 4/1972 | Zimmerman | 260/29.6 T |
| 3,728,314 | 5/1971 | Blank | 260/29.6 TA X |

FOREIGN PATENTS OR APPLICATIONS

| | | | |
|---|---|---|---|
| 940,854 | 11/1909 | Germany | 56/294 |
| 870,994 | 11/1907 | United Kingdom | 101/386 |

OTHER PUBLICATIONS

Blackley, High Polymer Latices (Maclaren/Palmerton 1966), pp. 127–130.
Chem. Abs. 72: P84893(r); 71: P83326(a); 57: P2508(h); 57: P7476(e); 56: P8942(e); 53: P7676(i).

*Primary Examiner*—Melvin Goldstein
*Assistant Examiner*—T. De Benedictis, Sr.

[57] ABSTRACT

An aqueous dispersion of emulsion copolymers of about 15 to 35 or 40 percent by weight of acrylic acid or methacrylic acid, about 20 to 60 percent by weight of an alkoxyalkyl acrylate, and from zero to 0.8 percent by weight of a diethylenically unsaturated monomer is used, in conjunction with an alkaline material, as a thickening agent.

10 Claims, No Drawings

THICKENER

PRIOR ART

An aqueous dispersion of an emulsion polymer of a carboxylic acid has been used heretofore for the thickening of aqueous systems, such as polymer latices, by adding the acid polymer dispersion to the system to be thickened which latter has an alkaline pH at the time of addition. See, for example, British Pat. No. 870,994 which discloses the use of a water-insoluble emulsion copolymer containing 25 to 70 percent by weight of methacrylic acid, at least 10 percent by weight of a copolymerized lower acrylate component constituted by one or more copolymerized acrylic acid esters of ($C_1$–$C_4$) alcohol, and 0 to 40 percent by weight of one or more other copolymerized neutral monoethylenically unsaturated monomers including the optional use of a small amount of a diethylenically unsaturated monomer, the dispersion containing a dispersing agent and having a solids concentration of 25 to 50 percent by weight. In many cases, extreme care must be exerted during the mixing of the acid thickener with the system to be thickened or during the addition of an alkaline material to avoid "shock", i.e., the coagulation of the dispersed materials. Also, copolymers of about 4 to 10 percent by weight of acrylic or methacrylic acid and 60 to 95 percent by weight of an alkoxyalkyl methacrylate, with or without a lower alkyl acrylate or methacrylate or acrylonitrile, have also been suggested as thickeners in German patent 940,854.

The acid copolymer thickeners of the prior art have generally been associated with the production of stiff, harsh hands when they have been used for thickening of impregnating materials for textiles, such as pigment-printing and dyeing compositions. They are also characterized by difficulty in formulation and impairment of water-resistance of the textile or other article treated with compositions containing the previously known thickeners of this type.

DESCRIPTION OF THE INVENTION

In accordance with the present invention, it has been found that these difficulties can be greatly minimized or virtually eliminated by using, as a thickener, an aqueous dispersion of a water-insoluble linear emulsion copolymer of about 15 to 40 percent, and preferably 20 to 35 percent, by weight of acrylic acid or methacrylic acid, about 20 to 60 percent by weight of one or more acrylic acid esters selected from certain alkoxyalkyl acrylates defined hereinafter, and about 10 to 65 percent by weight of a ($C_2$–$C_8$) alkyl acrylate, which copolymer may be, and preferably is, modified by copolymerization therewith in a final stage, of from 0.05 to 0.8 percent, preferably 0.1 to 0.5 percent, and most preferably 0.15 to 0.3 percent, by weight, based on the total weight of other monomers which make up the copolymer, of a polyethylenically unsaturated monomer.

The alkoxyalkyl acrylate is one of the formula:

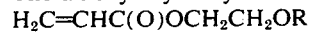

wherein R is methyl, ethyl, methoxyethyl, or ethoxyethyl.

The ($C_2$–$C_8$) alkyl acrylate may be ethyl, isopropyl, propyl, n-butyl, isobutyl, sec-butyl, pentyl, n-hexyl, heptyl, or 2-ethylhexyl acrylate, but is preferably n-butyl acrylate.

By copolymerizing alkoxyalkyl acrylate with the acid monomer, it has been found that a generally lesser amount of acid is necessary than is used in the thickeners of the British patent to provide the necessary solubility on neutralization for imparting comparable increased viscosity and thickening effect. The use of lesser amount of acid in conjunction with the hydrophilicity and softness of the alkoxyalkyl groups and the acrylate impart improved softness and hand to textiles impregnated therewith. The thickeners of the German patent, on the other hand, contain alkoxyalkyl methacrylates and are relatively hard even though the amount of acid in the copolymers is relatively small. The thickeners of the present invention are characterized, as a result of their composition, by a combination of properties, such as softness, efficiency of thickening, resistance to moisture, crock-resistance, print color or brightness, reduced strike-through, and so on that are difficult or impossible to attain with other thickeners of polymeric acid type.

By the second or final stage of polymerization, which produces preferred thickening copolymers, there is effected (1) a greatly increased molecular weight without appreciable cross-linking and (2) greater efficiency of thickening in many systems. When this procedure is employed, there is a very low degree of cross-linking which, in effect, greatly increases the molecular weight and thickening efficiencies of the (meth)acrylic acid copolymers in many systems. It is believed that the resulting polymer molecules are either highly branched or probably in the form of three-dimensional networks. In the sodium salt form, these networks swell several hundredfold and the consequent "micro-gel" structure acts as a highly efficient thickener. While the broad range of the proportion of the cross-linking agent used in the final stage is from 0.05 to 0.8 percent, by weight, the optimum benefits are obtained for many cross-linking agents in the range of 0.15 to 0.3 percent.

Examples of polyethylenically unsaturated monomers that may be used include any copolymerizable compound which contains two or more nonconjugated points of ethylenic unsaturation or two or more non-conjugated vinylidene groups of the structure, $CH_2=C=$, such as divinyltoluene, divinylbenzene, trivinylbenzene, divinylnaphthalene, ethylene glycol diacrylate or dimethacrylate, trimethylene glycol diacrylate or dimethacrylate, 2-ethyl-hexane-1,3-dimethacrylate, divinylxylene, divinylethylbenzene, divinyl ether, divinyl sulfone, allyl ethers of polyhydric compounds such as of glycerol, pentaerythritol, sorbitol, sucrose and resorcinol, divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylidenediacrylamide and 1,2-di-(α-methylmethylenesulfonamide)-ethylene.

The emulsion copolymers of the present invention generally have a molecular weight of at least 100,000 and may have a molecular weight as high as several million. They may be produced by conventional aqueous emulsion polymerization techniques using appropriate emulsifying or dispersing agents for emulsifying the monomers and for maintaining the polymer obtained in dispersed condition. The emulsifier may be used in a proportion of ½ to 6 percent of the weight of monomers. Preferably water-soluble initiators are used, such as the alkali metal or ammonium persulfates, in amounts from 0.10 to 3 percent on the weight of the monomers. Preferably, too, a redox system is used in which the persulfate or like initiator is used in conjunction with a reducing agent, such as sodium metabisulfite, in about the same proportion as the initiator. A promoter, such as small proportions of metal ions, such as copper or iron, may be used. The polymerization may be effected as a batch system or by continuous addition of the monomers to the aqueous solution containing initiator, reducing agent and promoter, the diethylenically unsaturated monomer being added last in preferred cases. Generally, it is unnecessary to heat the polymerization system and in many cases it may be desirable to cool the system to control the temperature and maintain it between room temperature and 85°–95°C. Agitation during the polymerization is generally desirable but may be omitted. The amount of water may be selected at the beginning of the polymerization procedure with reference to the amount of comonomers to be copolymerized so that any desired concentration on the order of 15 to 50 percent or more of copolymer is obtained in dispersed condition in the reaction vessel. The copolymer dispersion thereby obtained may be directly transported, or sold and shipped, to a point at which it is to be used for thickening or other purposes.

Examples of emulsifiers that may be used include anionic types, e.g., the alkali metal salts of higher alkyl sulfates, such as sodium lauryl sulfate, sulfonates, such as sodium α-hydroxy octadecane sulfonate, and nonionic types, such as the ethylene oxide derivatives of nonylphenol and tert-octylphenol having 8 to 50 oxyethylene units in the molecule.

For some purposes the dispersion of the copolymer may be dried, such as by a spray-drying technique or a drumdrying technique (in which the film is spread as a thin film on a heated drum), whereby a powder is directly obtained which can then be dissolved or dispersed in any solvent desired, either of aqueous or nonaqueous organic type.

The modified dispersions of the present invention may be used for thickening many aqueous systems, such as other emulsion copolymer dispersions obtained by emulsion polymerization, natural rubber latices as well as synthetic rubber latices, aqueous coating compositions for the paper, leather and textile industries, water-base paints, including those using aqueous dispersions of emulsion-polymerized vinyl or acrylic monomers, drilling muds, waxes, polishes, pigment suspensions, cosmetics and toiletries, food products and pharmaceuticals.

Among the latices and aqueous dispersions of vinyl and acrylic polymers that are obtained by emulsion polymerization and may be thickened by the use of the dispersions of the present invention are copolymers of styrene with butadiene, similar copolymers of acrylonitrile with butadiene, homopolymers of styrene, homopolymers of vinyl chloride, copolymers of 75 to 95 percent vinyl chloride with 25 to 5 percent of vinylidene chloride, acrylonitrile or vinyl acetate, polychloroprene, vinyl acetate homopolymers and copolymers, homopolymers and copolymers of acrylic acid esters or methacrylic acid esters, such as those of alcohols having one to eight carbon atoms listed hereinabove, also copolymers of the acrylic acid esters or methacrylic acid esters with vinyl chloride, vinyl acetate, acrylonitrile, styrene or the like.

The aqueous dispersions of these water-insoluble polymers may contain emulsifiers of anionic and non-ionic type. Suitable anionic emulsifiers that may be present include the higher fatty alcohol sulfates, such as the sodium or potassium salts of the sulfates of alcohols having from eight to eighteen carbon atoms, such as lauryl alcohol, alkali metal salts or amine salts of higher fatty acids, such as those of fatty acids having from eight to eighteen carbon atoms with sodium, potassium, or any of the ethanolamines, such as triethanolamine, examples of which include triethanolamine oleate or stearate, rosin soaps, sulfonated compounds such as turkey red oil or sulfonated ricinoleic acid, and sulfonate alkyl-aryl compounds, such as sodium dodecyl benzene sulfonate and sodium tert-octylphenoxyethanol sulfonate. Examples of non-ionic emulsifiers include alkylphenoxypolyethoxyethanols having alkyl groups of about seven to eighteen carbon atoms and about nine to thirty or more oxyethylene units, such as heptylphenoxypolyethoxyethanols, octylphenoxypolyethoxyethanols, methyloctylphenoxypolyethoxyethanols, nonylphenoxypolyethoxyethanols and dodecylphenoxypolyethoxyethanols; polyethoxyethanol derivatives of methylene-linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long-chained carboxylic acids, such as lauric, myristic, palmitic and oleic or mixtures of acids such as found in tall oil; ethylene oxide condensates of long-chained alcohols, such as octyl, decyl, lauryl, or cetyl alcohols; and ethylene oxide derivatives of etherified or esterified polyhydroxy compounds having a hydrophobic hydrocarbon chain.

The thickening agents of the present invention are particularly useful for the thickening of aqueous polymer systems, especially those used for the printing or dyeing of textiles. In this connection they can be used for thickening the aqueous printing dispersion or paste which contains the water-insoluble film-forming polymer generally in the form of a latex polymer or emulsion polymer. As compared to previously known thickeners of the acid/acrylate copolymer type, the thickeners of the present invention provide printed textiles in which the water-resistance of the print is unimpaired. The printing efficiency is greatly improved and a balance of superior print properties are obtained, such as soft hand, improved crock-resistance, minimization of strike-through, and improved depth of color and brightness.

Besides being useful in thickening aqueous systems, the emulsion copolymers of the present invention may be used to thicken polar organic solvent systems. These copolymer dispersions, in which the copolymer is still in acid form, are effective thickeners for methanol, ethanol, ethylene glycol, acetone, dioxane, methyl ethyl ketone, the mono-ethyl and mono-butyl ethers of diethylene glycol, and 2-butoxyethanol and systems containing such solvents mixed with other solvents including water; while, in the sodium salt form, they are effective thickeners for methanol, ethanol, glycerol, ethylene glycol and mixtures thereof with other solvents, such as water. Thus, they may be used for thickening paintremoving solvent systems so that they do not run off inclined and especially vertical walls or other surfaces.

In many instances, the preferred method of application of the dispersions of the present invention for thickening purposes is to add the aqueous dispersion of the copolymer of (meth)acrylic acid to the medium to be thickened and after thoroughly mixing therein, to introduce an alkaline material to neutralize the acid copolymer. For some aqueous dispersions, it is preferred that there be present an alkaline material which automatically neutralizes the copolymer as it is introduced. Neutralization is fairly rapid after the copolymer dispersion has been mixed in. The major portion of the thickening effect is obtained within a period of five to twenty or thirty minutes, although in some cases a small additional increase in viscosity may occur on standing longer.

Sufficient alkali may be employed to neutralize the acid copolymer completely or an excess thereof may be employed. However, it has been found in cases involving aqueous thickening that even greater thickening effects are frequently obtained when the proportion of alkaline material used is only sufficient to neutralize from 50 to about 75 percent of the carboxylic acid groups in the copolymer. This provides an additional way of obtaining a maximum thickening effect with a given amount of the thickening copolymer of the present invention. Of course, quite generally the degree of neutralization of the carboxylic acid groups in the copolymer must be such as to produce the desired thickening effect.

Alternatively, instead of adding the emulsion copolymer of the (meth)acrylic acid to the system to be thickened and neutralizing subsequently or as a result of the presence of an alkaline material in the aqueous system being thickened, the aqueous copolymer may be neutralized in its dispersion before it is added to the system to be thickened. Generally, however, if this procedure is employed, the aqueous dispersion of the thickening copolymer should first be diluted to about a 5 to 15 percent solids concentration to facilitate the handling thereof and especially the intermixing of the aqueous dispersion of the copolymer salt obtained by neutralization with the systems to be thickened.

Preferably, the first procedure is employed wherein the dispersion of the copolymer of (meth)acrylic acid before neutralization is added to the material to be thickened because an extremely high concentration, from 25 to 50 percent, of thickener solids can be employed and the compounder, in using such a high solids material, is handling a composition of low viscosity.

The proportion of the thickener that may be employed in any given system may fall within a wide range, depending upon the particular system and its concentrations. As little as 0.1 percent (by weight, based on total weight of solids in the system to be thickened) of thickener copolymer solids may be adequate for many purposes. On the other hand, for some systems, it may be desirable to use as much as 5 percent or more, such as 33 to 35 percent, of the thickener copolymer. Generally, the use of from 0.5 to 2 percent of the acid copolymer is adequate for most thickening purposes.

The thickening copolymer dispersions of the present invention may be added to all sorts of coating compositions of aqueous type, such as aqueous dispersions of water-insoluble emulsion copolymers, hydrophilic colloids, such as polyvinyl alcohols, hydrolyzed or partially hydrolyzed polyvinyl acetates, and the like which are of alkaline character. The addition of the thickening copolymer dispersions of the present invention to such systems renders the systems quite thixotropic and imparts short flow. This is useful when the compositions are intended to be applied to porous substrates and it is desired to have a relatively low penetration of such substrate. For example, in coating compositions intended to be applied to textile fabrics, such as printing pastes, the application of such pastes such as by passage through rolls is such that the shear of the roll sets the layer in position on the fabric without causing excessive penetration of the fabric. The thickening copolymer dispersions are especially valuable in the preparation of aqueous alkaline systems for the finishing, filling, rug backing and pigment-printing and dyeing of textile fabrics.

The copolymer dispersions of the present invention are useful as additives for drilling muds. The copolymers herein described are useful water-loss control agents and, since all commercial drilling fluids are alkaline, it is possible to add the copolymer dispersions in the acid form directly to the alkaline clay dispersion, that is, the drilling mud, where the copolymers are then solubilized by the alkalinity and serve to reduce the water-loss when the drilling mud contacts porous structures.

In the following examples which are illustrative of the invention, the parts and percentages are by weight unless otherwise specifically indicated and, unless otherwise noted, the viscosities are in centipoises and determined with a Brookfield viscosimeter at 6 R.P.M. and 25°C.

EXAMPLE 1

An emulsion of monomer in water is prepared by adding 61 g. of butyl acrylate, 102 g. of methoxyethoxyethyl acrylate, 0.43 g. diallyl phthalate, and 41 g. of methacrylic acid to 200 g. water containing 4.4 g. of a 23 percent solution of sodium dodecylbenzene sulfonate. 40 Ml. of this emulsion is added to a reaction vessel containing 680 g. water, 8.7 g. of a 23 percent solution of sodium dodecylbenzene sulfonate and 4 g. of sodium persulfate at 90°C. The reaction is allowed to exotherm. When the exotherm subsides, the remaining monomer emulsion is added over a period of 1 hour; the reaction mixture is heated to maintain its temperature at 88°-92°C. After the addition of monomer is completed, the mixture is held at 88°-92°C. for 30 minutes and then cooled. The product has a pH of 2.1 and a total solids of 18 percent. It is an aqueous dispersion of a copolymer of about 30 percent butyl acrylate, 50 percent methoxyethoxyethyl acrylate, 20 percent methacrylic acid, and 0.2 percent (on the other monomers) of diallyl phthalate.

EXAMPLE 2

An aqueous dispersion of about 18 percent solids is prepared by the method of Example 1 using the same monomers but reducing the amount of methoxyethoxyethyl acrylate from 102 g. to 71.5 g. and increasing the amount of butyl acrylate to 92 g.

EXAMPLE 3

An aqueous dispersion of about 18 percent solids is prepared by the method of Example 1 using 118 g. of methoxyethyl acrylate in place of the 102 g. of methoxyethyoxyethyl acrylate, increasing the amount of methacrylic acid to 61.3 g., reducing the amount of butyl acrylate to 24.1 g. and using 0.45 g. of diallyl phthalate.

EXAMPLE 4 a. A typical deep shade pigment-printing formulation is prepared by mixing 8 parts of a "clear" (2.8 percent solids thickener solution) with 2 parts of a pigment-/binder mix which is 17.5 percent pigment, 23 percent binder, such as an aqueous dispersion of an emulsion copolymer, and the balance to make 100 percent, of water.

Formulation of Print Clear Solution

| | Parts by Weight |
|---|---|
| H₂O | 92 |
| Thickener (solid) | 2.8 |
| 28% NH₄OH to pH 8.7 | As needed |
| H₂O | Quantity sufficient to make 100 total weight |

Deep Shade Paste

| | Parts by Weight |
|---|---|
| Clear | 80 |
| Aqueous dispersion of an emulsion copolymer of about 86% ethyl acrylate, 10% acrylonitrile, and about 4% of a mixture of acrylamide and N-methylolacrylamide (40% solids) | 10 |
| Aquaprint Blue 3G | 10 | b. A deep shade paste is made in accordance with procedure of part (a) hereof, using as the thickener, the polymer dispersions of each of Examples 2 and 3 and another is made in the same way, using as the thickener, the copolymer dispersion of Example 2 of the British Pat. No. 870,994. Each of the pastes is screen-printed on a cotton broadcloth, airdried, and cured by the heating for 5 minutes at 150°C. The resulting prints were evaluated for a number of properties, the ratings being on a scale of 1 through 5 wherein 1 is the best and 5 is the poorest. The viscosities of the pastes are those obtained on a Brookfield viscosimeter using spindle No. 4 at 6 r.p.m. at room temperature. The following table I summarizes the results:

Evaluation Results in Deep Shade Paste

| Thickener | Paste Viscosity | Print Property Rating | | | | Crock | |
|---|---|---|---|---|---|---|---|
| | | Hand | Strike-Thru | Depth | Brightness | Dry | Wet |
| Ex. 2 (British) | 22,200 | 5 | 4 | 4 | 5 | 1 | 3 |
| Ex. 2 | 24,500 | 1 | 3 | 3 | 4 | 1 | 1 |
| Ex. 3 | 26,000 | 3 | 2 | 2 | 1 | 4 | 2 |

EXAMPLE 5

The procedure of Example 1 is repeated, replacing the monomers used in making the monomer emulsion with the following:

| Monomer | Grams |
|---|---|
| Butyl acrylate | 20 |
| Ethoxyethyl acrylate | 122 |
| Methacrylic acid | 61 |
| Diallyl phthalate | 0.43 |

EXAMPLE 6

The procedure of Example 1 is repeated, replacing the monomers used in making the monomer emulsion with the following:

| Monomer | Grams |
|---|---|
| Butyl acrylate | 90.8 |
| Methoxyethyl acrylate | 51 |
| Methacrylic acid | 61 |
| Diallyl phthalate | 0.43 |

EXAMPLE 7

Efficiency of thickening water with the compositions of the present invention is demonstrated with the following data for 2.8 percent thickener solutions at pH 8.7 obtained with conc. ammonium hydroxide as in making the "clear" of Example 4(a).

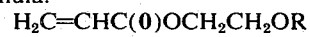

| | Evaluation of Water Thickening |
|---|---|
| Thickener | Brookfield Viscosity (Spindle No. 4, 6 rpm) |
| Example 2 (British) | 27,000 |
| Example 5 | 33,000 |
| Example 6 | 33,000 |

What I claim is:

1. A stable aqueous dispersion of a water-insoluble emulsion copolymer containing about 15 to 40 percent by weight of acrylic acid or methacrylic acid, 20 to 60 percent by weight of an alkoxyalkyl acrylate of the formula:

$$H_2C=CHC(O)OCH_2CH_2OR$$

wherein R is selected from the group consisting of methyl, ethyl, methoxyethyl, and ethoxyethyl, 10 to 65 percent by weight of a ($C_2$–$C_8$) alkyl acrylate, and zero to 0.8 percent by weight of a polyethylenically unsaturated monomer.

2. A method of thickening an aqueous medium which comprises adding a copolymer dispersion according to claim 1, or such dispersion diluted with water, to the aqueous medium and adding an alkaline neutralizing agent to neutralize some or all of the carboxylic acid groups in the copolymer, the amount of copolymer dispersion added and the degree of neutralization of the carboxylic acid groups being such as to thicken the aqueous medium.

3. A method according to claim 2, in which at least part of the alkaline neutralizing agent is introduced into the medium to be thickened before the addition of the copolymer dispersion.

4. A method according to claim 2, in which the alkaline neutralizing agent is introduced to the medium to be thickened after the addition of the copolymer dispersion.

5. A process according to claim 2 in which the medium to be thickened is an aqueous dispersion of an emulsion polymer.

6. A method according to claim 2, in which the medium to be thickened is an aqueous pigment suspension.

7. A method according to claim 4 wherein the amount of copolymer dispersion added is such as to provide 0.1 percent to 5 percent by weight of such copolymer, based on the total weight of solids in the thickened medium.

8. A dispersion according to claim 1 in which the monomer of the formula is methoxyethoxyethyl acrylate.

9. A dispersion according to claim 1 in which the monomer of the formula is methoxyethyl acrylate.

10. A dispersion according to claim 1 in which the monomer of the formula is ethoxyethyl acrylate.

* * * * *